United States Patent [19]

Steele et al.

[11] Patent Number: 5,720,834
[45] Date of Patent: Feb. 24, 1998

[54] METHOD FOR COVERING A PIPELINE BY WRAPPING

[75] Inventors: Robert Edward Steele, Richmond Hill; Michael A. Romano, Hamilton; Donald C. Warren, Mississauga; Alfredo Andrenacci, Toronto, all of Canada

[73] Assignee: Shaw Industries Ltd., Rexdale, Canada

[21] Appl. No.: 877,772

[22] Filed: May 4, 1992

[51] Int. Cl.$^6$ .................. B32B 1/08; B31C 81/06
[52] U.S. Cl. .............. 156/86; 156/162; 156/187; 156/272.2
[58] Field of Search ............... 156/85, 162, 165, 156/187, 188, 390, 392, 185, 272.2, 280.8, 86

[56] References Cited

U.S. PATENT DOCUMENTS

| | | | |
|---|---|---|---|
| 3,223,571 | 12/1965 | Straughan | 156/392 |
| 3,470,046 | 9/1969 | Verdin | 156/86 |
| 3,607,496 | 9/1971 | Kissell | 156/86 |
| 3,776,803 | 12/1973 | Kissell | 156/499 |
| 3,832,260 | 8/1974 | Straughan | 156/390 |
| 4,008,114 | 2/1977 | Lindsey | 156/392 |
| 4,025,375 | 5/1977 | Leasure | 156/79 |
| 4,472,468 | 9/1984 | Tailor et al. | 428/57 |
| 4,728,532 | 3/1988 | Koopman | 156/187 |
| 4,802,509 | 2/1989 | Brandolf | 138/110 |

OTHER PUBLICATIONS

Pikas, Joseph L., "Double Wrap Tape System Adopted for In Situ Recoating" Materials Performance, Jan. 1992, pp. 39–43.

Taylor, Sidney A., "Surface Preparation and Application of Plural" Materials Performance, Jan. 1992, pp. 33–37.

*Primary Examiner*—Richard Crispino
*Attorney, Agent, or Firm*—Ridout & Maybee

[57] ABSTRACT

A pipeline is covered with a continuous wrapping sheet having heat-activatable adhesive on its inner side. The wrapping may be helically applied or may be heat shrunk to impart a circumferential stress conforming the wrapping tightly to the surface of the pipe. High frequency induction heating is applied to cause the adhesive to wet and bond to the pipe surface. The wrapping can be applied progressively and continuously along a pipeline excavated from the ground while the pipeline is in service. The product conveyed within the pipe assists in rapidly cooling the adhesive and wrapping sheet so that the pipe can be promptly relaid in the ground.

16 Claims, 4 Drawing Sheets

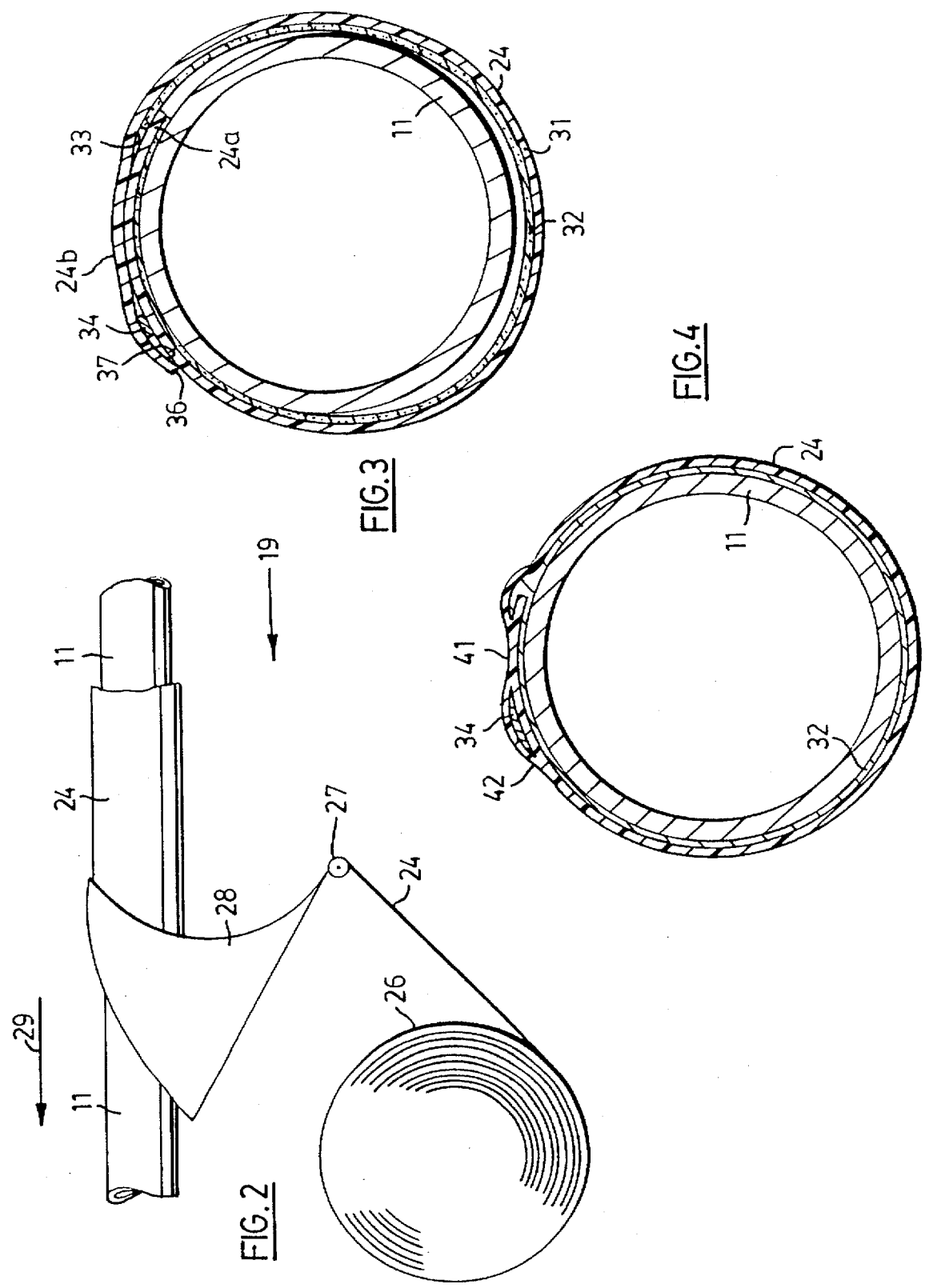

METHOD FOR COVERING A PIPELINE BY WRAPPING

It is the preferred practice in the current state of the art of construction of pipeline, especially in subterranean pipeline, to use pipe lengths or sections which are provided with an external protective coating whereby resistance to corrosion may be achieved. Such coating may be, for example, an extruded plastics coating. The ends of each section which are to be welded to adjacent sections are left bare and after welding and before putting the pipeline into service the bare areas are covered with a protective sleeve, for example a heat-shrinkable tubular sleeve or a wrap-around sleeve.

There are presently in existence many thousands of miles of pipeline which were either installed unprotected by coating, or for which the originally applied coatings have deteriorated beyond the point of being effective. It would be desirable to maintain these lines in service while rehabilitation is being carried out, but this is often difficult with known methods for recoating of the pipeline.

A variety of methods have been used to recoat such pipelines for all of which the lines must first be excavated to such a depth as to allow sufficient access for the necessary equipment for cleaning, repairing and recoating.

One commonly used technique is to apply a solvent-based anti-corrosion primer to the cleaned and repaired pipeline, and thereafter to wrap in helical fashion a polyethylene or plasticized poly-vinyl chloride tape coated on one side with a soft, pressure-sensitive sealant or adhesive. The primer application may be by hand painting, or by a machine which travels along the pipe dispensing the primer and spreading it on the surface. Likewise, the adhesive tape may be hand wrapped, wrapped with a hand operated wrapping device, known as a "wrapster", or wrapped by a machine which has one or more tape dispensers which rotate in planetary fashion around the pipe. This procedure is described by J. L. Pikas in an article entitled "Double-Wrap Tape System Adopted in In Situ Recoating", Materials Performance, January 1992, pp. 39–43.

While this process is commonly used, it suffers from the need to apply primer containing organic solvents, which solvents are environmentally undesirable, and which take a considerable time to dry before the wrapping can be applied. Furthermore, the apparatus for applying the tape requires that either a very large space be excavated around the pipe or that the pipe be lifted out of the ditch. The former is expensive, and in many cases may be impossible, while the latter may put unacceptable stresses on the pipe, and is particularly dangerous if the pipeline is carrying a pressurized gas, such as natural gas or carbon dioxide.

Furthermore, because only mechanical tension is available as a means to bring the sealant or adhesive into complete contact with the primed surface, the sealant or adhesive must necessarily be soft enough to flow under the influence of such low forces as the tensioned polymeric sheet can apply. Such forces are typically considerably lower than the forces exerted by the soil on the pipeline in service, and thus such coatings often do not stand up well in service, becoming wrinkled or torn by the shearing action created when the surface of the pipe moves in relation to the surrounding soil. Such movement is created, for example, by thermal expansion and contraction of the pipeline or by freezing and thawing of the soil, or by changes in the operating pressure.

An alternate method is to coat the pipeline with a liquid plural component curable composition, such as a two component urethane, a two component epoxy, or a two component coal tar epoxy. One example of such a process was described in detail by S. A. Taylor in an article entitled "Surface Preparation and Application of Plural-Component Coatings to Pipeline During Rehabilitation", published in Materials Performance, January 1992, pages 33–37. This article and the references cited therein are hereby incorporated by reference into this application. Most commonly, two component urethane coatings are used in this method because their curing rate can be faster and is more easily controlled than that of epoxies. In this method, the pipe must first be cleaned using grit or sand blasting, to provide a "near-white" finish. Plural component spray equipment, which mixes the two components just prior to atomization, is used due to the very short pot life of such coatings. A ring of such spray nozzles surrounds the pipe, and the output must be synchronized with the speed at which the equipment moves along the pipe in order to control coating thickness. After the coating is applied, the pipe cannot be laid back down until the coating has hardened sufficiently to withstand the weight.

Plural component systems yield, under ideal circumstances, excellent coatings which are resistant to soil stresses, cathodic disbondment, etc. However, they require a very high level of surface preparation. If this is not provided, their resistance to cathodic disbondment can decrease catastrophically. Furthermore, the cure rate of such coatings is very sensitive to temperature, becoming very slow or even stopping at temperatures below about 5°–15° C. This makes them particularly inadequate for application to live lines carrying liquids at low temperatures, as is common on water or oil lines. Still further, the process for applying them is complex and difficult to control, particularly in the unpredictable environment of the field.

A third method is to apply to the cleaned and repaired pipeline heat shrinkable wraparound sleeves in successive overlapping fashion. These are applied by hand wrapping each sleeve and shrinking it with a torch. However, in addition to being very labour intensive, it is often not possible, particularly with live lines carrying liquids at low temperature, to heat the surface of the pipe sufficiently to ensure wetting of the surface by the adhesive on the sleeve. To overcome this, it has been common practice, particularly on lines operating at a temperature of about 20° C. or less, to first apply a suitable solvent-based anti-corrosion primer. After this has dried, which takes approximately one hour, heat shrinkable wraparound sleeves coated with a thick layer of a very soft, gummy mastic sealant are applied. While such a process provides excellent resistance to corrosion, it does not provide good resistance to soil stresses, and is therefore confined primarily to use on small diameter pipes operating in low soil stress environments.

It is the objective of this invention to overcome the shortcomings of known methods of recoating pipelines by providing a method whereby a wrapping sheet which preferably is of tough polymeric material coated on one side with an adhesive, preferably a tough, shear-resistant heat activatable adhesive, can be applied in situ to an existing pipeline such as to achieve an excellent bond which is resistant to cathodic disbondment and has sufficient shear resistance to be able to withstand the stresses generated by relative movement between the pipe and the soil. A further object of this invention is to provide a coating that is inherently uniform in thickness and not dependent upon complex synchronization of the speeds and/or outputs of different pieces of equipment, as is required when applying plural component equipment. It is a further object of this invention to provide a method that is relatively insensitive to surface temperature, not requiring the use of a liquid primer to provide an acceptable resistance to peeling and cathodic disbondment.

According to the present invention there is provided a method for covering a pipeline, comprising wrapping the pipeline with a continuous polymeric wrapping sheet having a heat-softenable adhesive on the side applied to the pipeline, applying a stress to the wrapping sheet so as to generate a stress having at least a component extending circumferentially of the pipeline, so that the sheet together with the adhesive grips the exterior of the pipeline in tight conformity thereto, and exposing the wrapped pipeline to electromagnetic induction heating at a frequency and an intensity and for a period sufficient to heat the outer skin of the pipeline transiently, thereby softening the adhesive sufficiently to cause the it to wet-out and bond to the exterior surface of the pipeline.

Advantageously, the method of the invention is applied to a pipeline while it is in service. The method may, of course, if desired be applied to an empty pipeline before service or to a pipeline that has been emptied. The presence of fluid in the pipeline, especially of a liquid with a high heat capacity, is advantageous since it assists in more efficiently dissipating heat. This allows the adhesive and the wrapping sheet, which become heated by conduction, to cool more rapidly. As a result after a short interval the wrapped pipeline can be safely relaid in the trench from which it was excavated, and the rehabilitation process can therefore be completed more speedily.

BRIEF DESCRIPTION OF THE DRAWINGS

The invention is described in more detail, by way of example only, with reference to the accompanying drawings, in which:

FIG. 2 shows schematically a pipe wrapping unit;

FIGS. 3 and 4 are cross-sections taken on the lines III—IV and IV—IV in FIG. 1, showing the wrapped pipe before and after shrinking;

Referring to the drawings, FIG. 1 shows a mobile unit 10 for covering a pipeline comprising a pipe 11 excavated from a trench, the bottom of which is indicated by broken line 12, dug below the ground surface 13. In the preferred form the pipe 11 is to be covered while in service carrying liquid, for example oil or water, at a temperature typically in the range 5° C. to 70° C.

The pipe 11 will typically have been excavated and cleaned, using, for example, the self-propelled pipe cleaning machine described in U.S. Pat. No. 5,001,801 dated Mar. 26, 1991 and assigned to the assignee of the present application.

Figure 1:
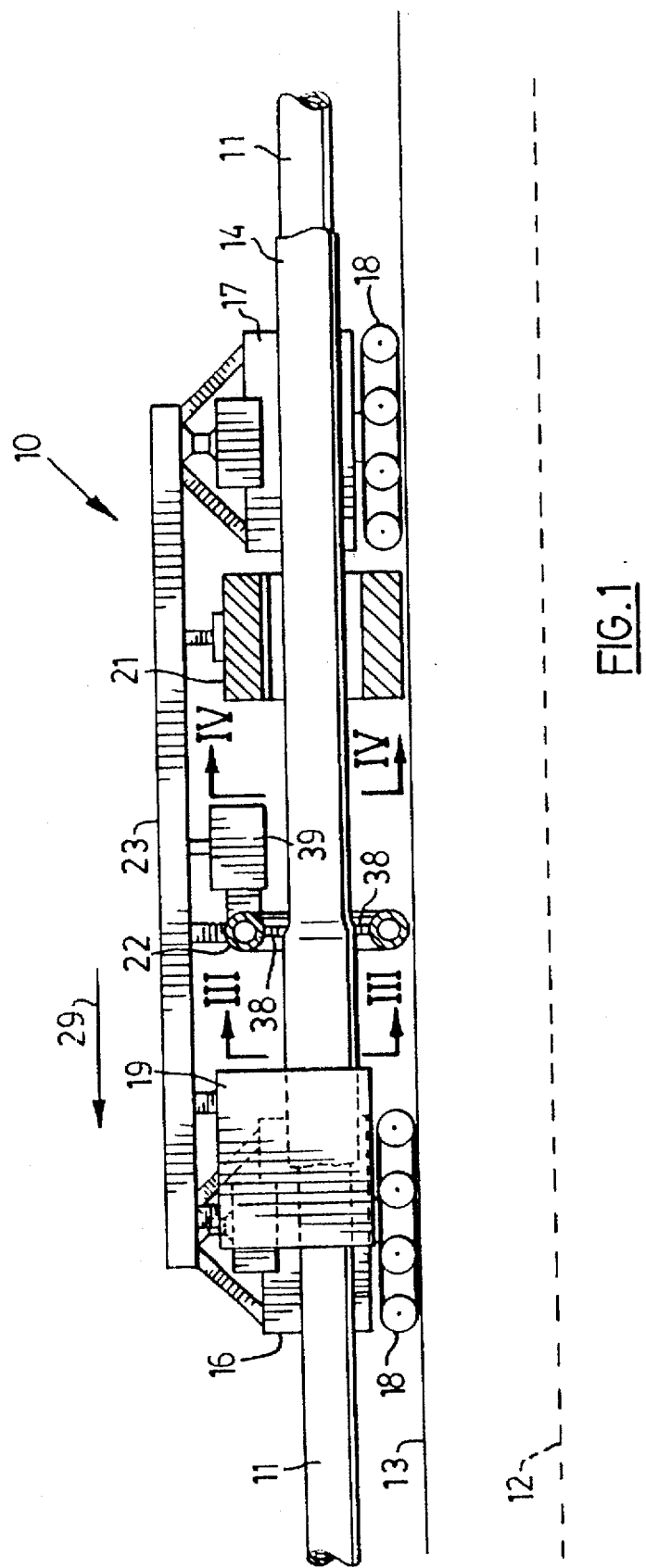
FIG. 1 shows somewhat schematically a side view of a mobile pipe rehabilitation unit.

The mobile unit 10 shown in FIG. 1 runs continuously along the cleaned pipe 11 and continuously applies to it a covering 14.

In the example illustrated, the unit 10 comprises front and rear propulsion and generator units 16 and 17 respectively. At least one of units 16 and 17 includes one or more internal combustion engines which drive ground reaction members such as wheels or, preferably as in the example shown, tracks 18. Preferably, the unit 10 travels along the pipeline at a linear speed of about 2 to about 50 feet per minute, more preferably about 5 to 15 feet per minute. In the example illustrated, the unit 10 comprises a wrapping unit 19 and a high frequency induction coil 21 and a ring burner 22 between the unit 19 and the coil 21. The front and rear units 16 and 17 may support a main beam 23 from which the wrapping unit 19, coil 21 and burner 22 are supported. Alternatively, units 19, 21 and 22 may be on trailers pulled by unit 16 so as to allow for individual alignment to bends in the pipeline.

The wrapping unit 19, induction coil 21 and burner 22 are each formed in separable portions which are brought together from each side of the pipe 11 so as to encircle the pipe 11, and the necessary mechanical, electrical, or other interconnections formed between the two halves. For example, the units 19, 21 and 22 may be in the form of clam shell-like halves which may be pivoted between open and closed positions and the beam 23 may be provided with means whereby it may be raised and lowered relative to the units 16 and 17. In this way, the unit 10 can be engaged with or disengaged from a continuous pipeline at any desired point along its length.

The units 16 and 17 provide services, for example electrical services, for powering and controlling the wrapping unit 19, coil 21 and burner 22. Usually, therefore each unit 16 and 17 comprises an electrical generator and a hydraulic pump for powering hydraulic motors and cylinders connected to the beam 23 for raising and lowering the beam and to the clam shell-like halves referred to above for opening, closing and positioning the halves relative to the pipe 11. The unit 17 normally also provides coolant, such as a flow of cooled water, for cooling the induction coil 21.

In the preferred form the wrapping unit 19 is of the so-called "cigarette-wrapping" type illustrated in FIG. 2 which applies a wrapping sheet 24 continuously longitudinally of the pipe 11 and overlaps opposing edges of the sheet to form a longitudinal seam. Such a wrapping unit is described in, for example, Straughan U.S. Pat. Nos. 3,233, 571 dated Dec. 14, 1965 and 3,832,260 dated Aug. 27, 1974, and need not be described in detail herein. The disclosures of the Straughan U.S. Pat. Nos. 3,113,571 and 3,832,260 are hereby incorporated herein by reference. Briefly, the continuous sheet material 24 is taken from a reel 26 thereof, passes over a deflecting roller 27 and over a generally wing-shaped continuously curving former 28. The sheet material is drawn from the reel 26 and over the roller 27 and former 28 as a result of longitudinal movement of the unit 19 in the direction of the arrow 29 in FIGS. 1 and 2 relative to the pipe 11. The width of the sheet 24 and the dimensions of the former 28 are selected in relation to the diameter of the pipe 11 so that, as the sheet 24 is drawn rearwardly over the former 28, the edges of the former 28 engage the edges of the sheet 24 from underneath and lift then upwardly on opposite sides of the pipe 11 and then fold one edge 24a as seen in cross-section in FIG. 3 on the top of the pipe 11 and the opposite edge 24b in overlapping relationship on the edge 24a. Roller members may be supported within the unit 19 to engage the edges 24a and 24b downstream from the former 28 to assist in folding the edges into overlapped configuration and in maintaining such overlapped configuration until the edges 24a and 24b are sealed together.

In the preferred form, the wrapping sheet 24 comprises a transversely heat shrinkable backing sheet 31 having a coating of heat activatable adhesive 32 extending part way across its inner side to be applied to the pipe, and has an adhesive-free zone 33 adjacent one edge, as described for example in Tailor et al U.S. Pat. No. 4,472,460 dated Sep. 18, 1986, the disclosures of which are incorporated herein by reference. In the preferred form, the former 28 feeds the end portion having the adhesive-free zone so as to form the upper or overlap portion 24b. Preferably the sheet 24 has a stripe of hold-down adhesive 34 extending parallel to and spaced from the free end 36 of the overlap portion 24b, so as to define a further adhesive-free portion 37 between the hold-down adhesive 34 and the free end 36. Preferably, the backing sheet 31 is a crosslinked polymer sheet which has been stretched transversely, for example in a continuous tentering operation, to a dimensionally heat unstable form. Examples of suitable materials for the backing sheet 31 and for the adhesives 32 and 34 reference are disclosed in the above-mentioned Tailor et al U.S. Pat. No. 4,472,468 to which reference should be made for further details. If the adhesive 32 has a tacky surface, the wrapping sheet 24 as reeled up on the supply reel 26 will require a continuous release liner sheet, for example a silicone coated plastic sheet covering the adhesive portions 32 and 34 and preventing adjacent turns of the sheet 24 from sticking to one another in the reeled-up state. Such release liner sheet may be stripped from the sheet 24 at the roller 27 and taken up on a take-up roll (not shown) driven by an electric or hydraulic motor.

As the unit 10 travels forwardly relative to the pipe 11, the portion loosely wrapped with the wrapping sheet 24 as seen in cross section in FIG. 3 travels though the ring burner 22 which encircles the pipe 11 and is provided with a number of burner orifices 38 shown somewhat schematically in FIG. 1. The burner 22 is preferably a gas burner supplied with gas from a tank 39 supported on the beam 23 or on one of units 16 or 17, or on a separate vehicle which also travels along with the coating equipment. The burner 22 applies heat to the wrapping sheet 24 and performs two functions. Firstly, it softens the adhesive 32 and shrinks the sheet 31 so that it attempts to shrink to a circumference smaller than the circumference of the pipe 11, thereby setting up hoop stresses in the sheet 31 so that the sheet 31 and the heat softened adhesive 32 are conformed tightly to the exterior of the pipe 11 and substantially all entrapped air and bubbles between the adhesive 32 and the surface of the pipe 11 are expelled longitudinally outwardly. Secondly where, as in the example shown in FIGS. 3 and 4, the sheet 24 is adapted to have its overlap portion welded, the heat from the burner serves to weld the adhesive-free portions 33 and 37 of the overlap portion 24b to the underlap portion 24a to form corresponding welded portions 41 and 42 seen in FIG. 4, so that the wrapping sheet 24 is formed into a seamless enclosure for the pipe. When, as in the preferred form, the pipeline 11 is in service, the conveyed liquid acts as a heat sink and it is not normally possible by external heating of the sheet 31 to raise the temperature of the pipe 11 sufficiently to cause the adhesive to flow out on and to wet the surface of the pipe 11. Hence, at this stage a properly wetted-out bond between the adhesive 32 and the pipe 11 is not achieved. By properly wetted-out is meant that a sufficiently good contact to provide satisfactory resistance to both cathodic disbondment and peeling has been achieved. The use of propane torches or other externally applied sources of heat to achieve welding and shrinking of heat shrinkable wrap-around coverings is well known to those skilled in the art and need not be described in detail herein. Typically, it is desirable to achieve a temperature of about 120° C. to about 200° C. at the interface between the underlap and overlap portions 24a and 24b in order to achieve a good quality weld, while somewhat lesser temperatures need to be achieved in the single thickness portions of the sheet 24 in order to satisfactorily soften the adhesive and cause shrinkage of the sheet 31. The configuration of and positioning of and heat outputs of the burner orifices 38 therefore should be selected in relation to the speed of travel of the unit 10 forwardly over the wrapped pipe 11 to achieve the desired temperatures. It is of course also readily possible to determine by trial and experiment the extent of and duration of heating required to form a satisfactorily welded and shrunk-down wrapping 24. For example, the burner 22 may be provided with more than one burner orifice spaced in the longitudinal direction adjacent the upper or overlap portions 24a and 24b of the sheet 31 in order heat these portions more intensively, while only a single row of burner orifices may be necessary and around remainder of the perimeter of the wrapped pipe 11.

It is not essential that the sheet 24 should be welded to form a seamless enclosure. For example, an adhesive coated transversely heat-shrinkable sheet such as sheet 24 may be applied to the pipe and have its edges overlapped generally as shown in FIGS. 2 and 3 and a narrow adhesively coated longitudinally continuous closure strip may be applied longitudinally over the overlap portion. The adhesively coated side of the closure strip contacts the overlap portion and forms an adhesively bonded closure which holds the overlapped edges of the heat shrinkable sheet together when the latter is shrunk by passage through the burner 22. This sets up hoop stresses in the shrunk-down sheet. Examples of such adhesively-bonded closures are described in detail in the above-mentioned Tailor et al U.S. Pat. No. 4,472,468, incorporated herein by reference, for example with reference to the product designated Canusa LPW and with reference to FIGS. 3 and 4 of the said Tailor et al patent. The above-mentioned Straughan et al U.S. Pat. No. 3,832,260 incorporated herein by reference describes techniques for applying a longitudinally continuous closure strip from a continuous reel thereof to the overlap portion of a pipe having a sheet wrapped cigarette-wrapped fashion thereabout and such techniques are well known to those skilled in the art and need not be described in detail herein.

With further travel forwardly of the unit 10, the high frequency induction heating coil 21 travels over the pipe wrapped in the shrunk-down wrapping sheet 24. The function of the coil 21 is to transiently heat the skin or surface portion of the pipe 11 by induction heating to a temperature and for a period sufficient to melt or soften the adhesive 32 so that it wets and bonds to the entire surface of the pipe 11. Desirably, the power output and excitation frequency of the coil 21 are selected having regard to the speed of travel of the coil 21 relative to the pipe so that the outer skin of the pipe 11 is heated to a temperature of about 120° to about 300° C. for a period of about 5 to about 30 seconds, more preferably about 140° to about 250° C. for about 10 to about 20 seconds. The actual temperature and time required will vary with the type of adhesive, but in most cases an interface temperature above 200° C. for more than about 15 seconds is sufficient. Preferably, the frequency of the current applied to the coil is about 3 to about 50 kHz. With frequencies less than about 3 kHz, the penetration of the inductive heating into the metal of the pipe tends to be excessive and therefore greater power outputs are required in order to raise the outer skin of the pipe 11 to a desired temperature. Lower frequencies also heat a greater proportion of the pipe, therefore requiring a longer time to cool down before the coated pipe can be set down again. In addition, if the frequency is low it is necessary to maintain the coil 21 close to the pipe surface in order to achieve adequate heating. As the frequency of the field generated by the coil 21 is increased, the depth of penetration of the energy into the pipe 11 decreases. Typically at about 10 kHz the penetration of the energy into the wall of the pipe 11 is only about 0.03 to about 0.035 inches, resulting in a steep temperature gradient between the inner and outer surfaces of the wall of the pipe 11. The higher the power applied to the coil and hence the higher the intensity of the field, the steeper the temperature gradient. Further, the lower the coefficient of heat conduction through the metal of the pipe, the steeper the temperature gradient. It is therefore possible by selection of the power and frequency outputs of the coil 21 to heat the outer skin of the pipe 11 transiently to achieve the desired temperature range for the required time. Such heating can be achieved even though the inside surface of the pipe 11 is cooled by contact with the relatively cool liquid conveyed therein, because of the steep temperature gradient which is achieved. The period for which the surface of the pipe 11 is maintained within a desired temperature range depends on the axial length of the coil 21 and the speed of travel of the coil 21 relative to the pipe 11. Preferably, the frequency of field is not greater than about 50 kHz, since high frequencies may be difficult to generate with the conventional high frequency induction heating coil equipment and may interfere with radio communications. More preferably, the frequency is about 7 to about 15 kHz. As will be appreciated, by selection of the frequency, power and axial length of the coil 21, it is readily possible to heat the outer surface of the pipe 11 sufficiently to soften and activate the adhesive 32 so that, under the pressure exerted by the hoop stress in the wrapping sheet 24, the adhesive flows onto and wets the surface of the pipe 11 forming a strong bond between the pipe and the protective sheet 24.

Various modifications may of course be made to the process described in detail above, as will be readily apparent to one skilled in the art. For example, the transversely heat-shrinkable longitudinally continuous wrapping sheet 24, instead of being of one piece construction as described above with reference to FIG. 3 may instead be of pre-welded two piece sheet form as described in Smythe et al U.S. patent application Ser. No. 07/519,473 filed May 7, 1990 or in Steele et al U.S. patent application Ser. No. 07/660,866 filed Feb. 26, 1991. Such pre-welded two-piece sheet may comprise a transversely heat shrinkable longitudinally continuous main backing sheet with a closure strip in the form of a longitudinally continuous tape welded along one edge. Moreover, the wrapping sheet 24 may be of the type described in Steele et al U.S. patent application Ser. No. 07/696,479, having a closure sheet in the form of a separate longitudinally continuous tape provided with hold-down adhesive along each marginal edge and which is supplied continuously to form a closure over overlapped edge portions of a main transversely heat shrinkable longitudinally continuous wrapping sheet. In the latter case, the modified form of wrapping unit for cigarette-wrapping of the pipe referred to above may be employed having means for applying a separate continuous closure tape, as disclosed in, for example the above-mentioned Straughan et al U.S. Pat. No. 3,832,260 incorporated herein by reference. The said above-mentioned Smythe et al application Ser. No. 07/519,473 and the said Steele et al application Ser. Nos. 07/660,866 and 07/694,479 are also all incorporated herein by reference.

Instead of using a ring burner, other means may be used for heating the wrapping sheet 24 in order to effect shrinking and to weld or otherwise bond the juxtaposed edges together. For example radiant heaters may be employed or the wrapped pipe 11 may pass through a tunnel-like oven supported on the support beam. The oven may be, for example, electrically heated or may be gas- or oil-fired.

Figure 5:
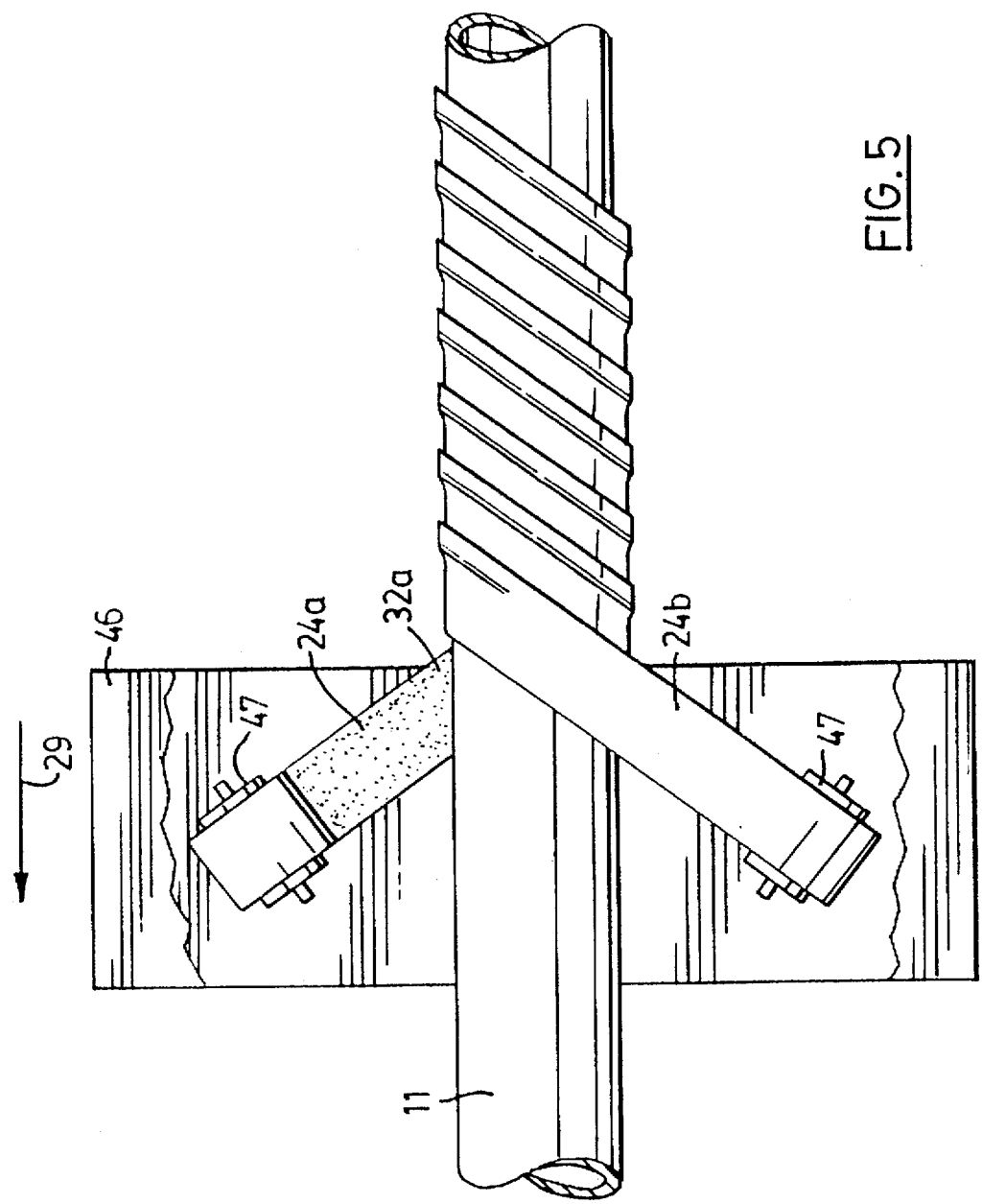
FIG. 5 is a side view partially in section showing a pipe wrapping unit according to another embodiment of the invention.
Figure 6:
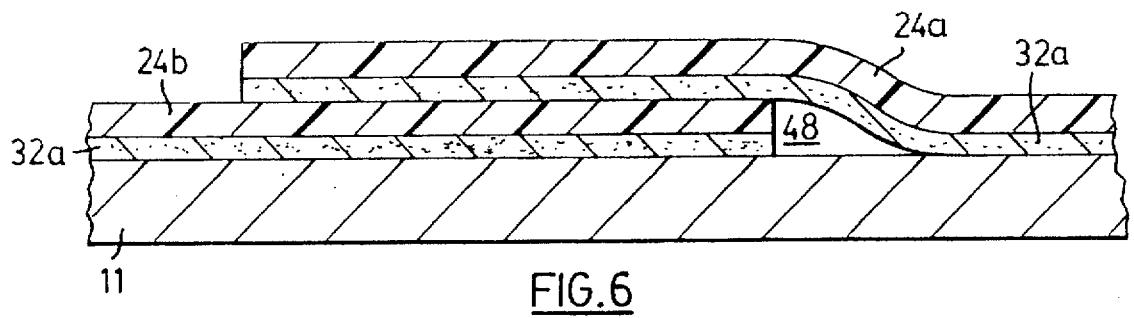
FIGS. 6 and 7 show a longitudinal section through adjacent turns of wrapping tape applied to a pipe before and after heating, respectively.
Figure 7:
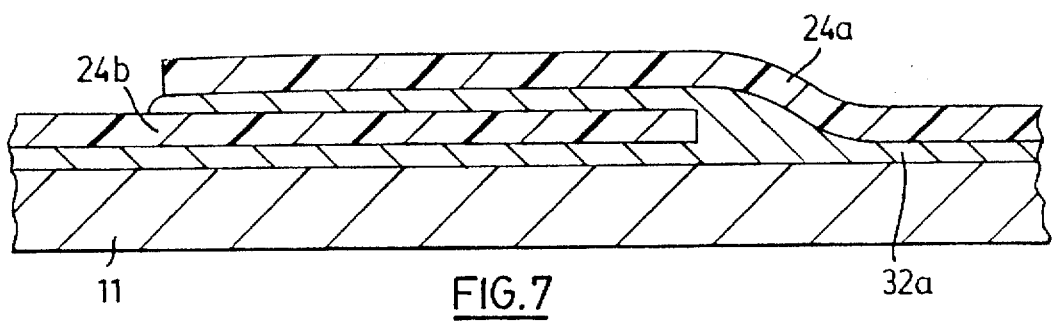
Figure 8:
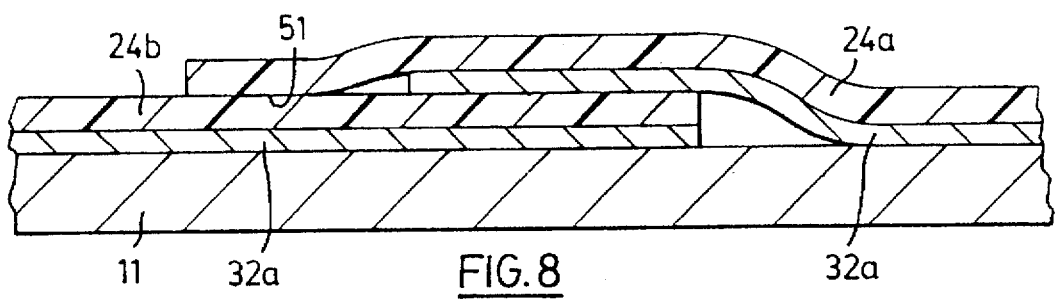
FIGS. 8 and 9 are similar longitudinal sections through adjacent turns of wrapping tape applied to a pipe before and after heating, and wherein a tape having an adhesive free edge is employed.
Figure 9:
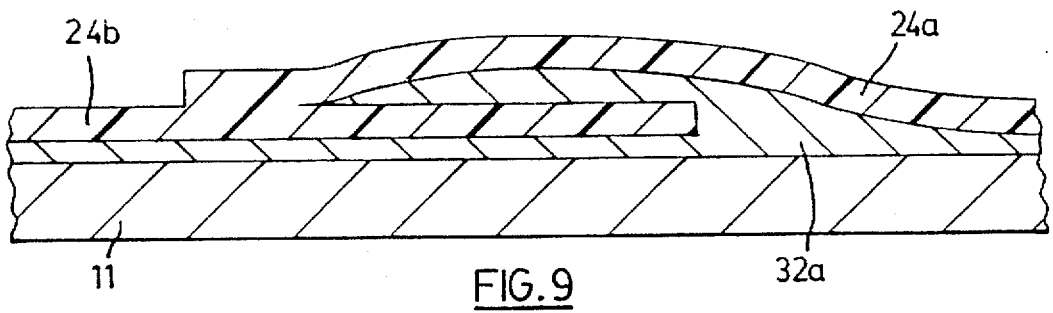

Further, other means may be employed for enclosing the pipe in an adhesive backed continuous wrapping sheet having a tensile stress with a circumferential component. The adhesive coated polymeric covering may also be applied to the pipe using helical wrapping equipment. Such machines are equipped with heads which hold one or more spools of tape, which heads apply mechanical tension to the tape while rotating in planetary configuration around the pipe illustrated in FIG. 5 as the machine travels along its length. Such equipment has for many years been used to apply anti-corrosion wrapping tapes, such as those produced by Denso, Polyken Division of The Kendall Oil Company, the Tapecoat Company, and a large number of other suppliers. Such equipment is well known to those skilled in pipeline coatings, and need not be described in further detail here. Briefly FIG. 5 shows a modified form of wrapping unit 19a comprising a frame 46 that is spun around the axis of the pipe 11 as the unit advances relative to the pipe in the direction of the arrow 29, in order to effect helical wrapping of the pipe 11. The helical wrapping may have more than one start. For example FIG. 5 shows a two start wrapping wherein two continuous wrapping tapes 24a and 24b having adhesive coatings 32a on their inner side are led off from respective supply reels 47 supported on the frame. Each tape 24a and 24b may be covered with a release liner which is removed from the tape, for example on a driven take-up reel, before application to the pipe 11. Such wrapping equipment can apply sufficient tension to the wrapping material tapes 24a and 24b to bring the adhesive into close proximity to the surface of the pipe. Consequently, although the tapes 24a and 24b may be longitudinally heat shrinkable, when such a method is used to apply the covering, the need for the covering tapes to be heat shrinkable is reduced or eliminated. Nevertheless, a heating stage after wrapping of the tape but prior to induction heating is preferred in order to make the adhesive flow out and conform to the surface of the pipe, eliminating the void 48 present at the edge of the underlap 24b before heating, as shown in FIG. 6, and expelling any air entrapped by the wrapping process, as seen in FIG. 7. A preferred embodiment of this uses a longitudinally stretched tape coated partially across its width with a heat activatable adhesive 32a, as shown in FIG. 8. This is applied to the pipe with the adhesive-free edge 51 overlapping the opposite side of the previous wrap 24b, and upon sufficient heating this will form a fusion bond as seen in FIG. 9. Such a fusion bond is particularly resistant to lifting when the pipe surface moves in relation to the surrounding soil, and behaves like a seamless coating in this respect. As examples of suitable materials for the tapes 24a and 24b and for the adhesive 32a may be mentioned the materials employed for the wrap-around sheets and for the adhesive sealants in the above member Tailor et al U.S. Pat. No. 4,472,468 and in the above-mentioned Smythe et al patent application Ser. Nos. 07/519,473, and of Steele et al patent application Ser. Nos. 07/660,866 and 07/694,479. In the case in which the tapes 24a and b are pre-tensioned elastically as they are applied to the pipe and are not to be heat shrunk, the tapes 24a and b may comprise uncrosslinked polymers.

A detailed Example of one form of the method of the present invention will be given.

EXAMPLE

The method was applied to an 8" diameter steel pipe through which water was flowed at a temperature of 16°–18° C. and a flow rate of 20 gpm. The pipe was enwrapped in a transversely heat shrinkable adhesive-coated wrapping sheet of the type described above with reference to FIG. 3 having the following characteristics:

Backing sheet

Thickness: 0.9 mm

Composition: linear low density polyethylene blended in equal parts with ethylene-vinylacetate copolymer Degree of crosslinking: 60%

Stretch ratio: 1.3

Adhesive

Thickness: 1.4 mm

Composition: Ethylene-vinyl acetate based hot melt adhesive

Softening Point (Thermal Mechanical Analysis): 63°–67° C.

Hold-down Adhesive

Thickness: 0.25 mm

Width: 12 mm

Composition: crosslinked butyl

A weld has achieved at the adhesive free interface between the overlapped portions employing a conventional propane torch applied to the exterior and then propane torch heating was applied to entire circumference to shrink the sleeve down tightly onto the pipe.

A water-cooled AJAX-MAGNATHERMIC (trade-mark) high frequency induction heating coil (available from Ajax-Magnathermic Canada Limited, Ajax, Ontario, Canada) was applied over the pipe carrying the shrunk-down sheet. The coil was of hollow cylindrical form, of axial length 15 inches, and the wrapped pipe was passed through the cylindrical hollow within the coil. Relative movement between the pipe and the coil at a speed of 5 feet/minute was effected.

The coil was powered at 10 kHz with a power output of 140 KW and the temperature of the outer surface of the pipe was measured with a thermocouple applied on the pipe surface under the shrunk-down wrapping sheet. As the induction coil passed over the pipe, the temperature of the pipe surface increased from 10° C. to a peak of 225° C. in a space of about 15 seconds, then dropped back down to 20° C. in a further 20 seconds. Based on a wall thickness of 6.35 mm and an inside temperature of 10° C., this peak temperature corresponded to an average temperature gradient of 34° C./mm (1548° F./inch). After about 5 minutes, a section of the sleeve was peeled, revealing perfect adhesion and wetting of the surface of the pipe by the adhesive.

We claim:

1. A method for covering a pipeline comprising:

(a) wrapping the pipeline with a continuous polymeric wrapping sheet having a heat-softenable adhesive on the side applied to the pipeline;

(b) applying a stress to the wrapping sheet and so as to generate a stress having at least a component extending circumferentially of the pipeline, so that the sheet together with the adhesive grips the exterior of the pipeline in tight conformity thereto; and (c) exposing the wrapped pipeline to electromagnetic induction heating at a frequency and an intensity and for a period sufficient to heat the outer skin of the pipeline transiently and soften the adhesive sufficiently to cause the adhesive to wet and bond to the exterior of the pipeline.

2. A method as claimed in claim 1 wherein step (a) comprises winding said wrapping sheet helically about the axis of the pipeline.

3. A method as claimed in claim 2 wherein the wrapping sheet is longitudinally heat shrinkable and is heated after application to the pipe to impart a longitudinal tensile stress therein having components circumferentially and longitudinally with respect to the pipe.

4. A method as claimed in claim 2 wherein a tensile stress is applied to the wrapping sheet before it is wound on the pipe.

5. A method as claimed in claim 1 wherein step (a) comprises applying a transversely heat shrinkable wrapping sheet continuously longitudinally along the pipeline and including the steps of overlapping opposing edges of the sheet to form a longitudinal seam, and step (b) comprises connecting the overlapped edges together to form a tubular sleeve, and heating the tubular sleeve to shrink the sleeve down into tight conformity with the exterior of the pipeline.

6. A method as claimed in claim 5 wherein said wrapping sheet comprises an adhesive free marginal zone along the interface between the overlapped edge portions.

7. A method as claimed in claim 6 including the step of fusing together the overlapped edge portions at the adhesive free interface to form a seamless tubular sleeve.

8. A method as claimed in claim 6 wherein said overlapped edge portions are adhered together with hold-down adhesive applied along one of said overlapped edge portions adjacent said adhesive free zone.

9. A method as claimed in claim 8 wherein said hold-down adhesive is spaced inwardly from the edge of said one overlapped edge portion.

10. A method as claimed in claim 1 wherein said induction heating is conducted at a frequency of about 3 to about 50 kHz.

11. A method as claimed in claim 10 wherein said frequency is about 7 to about 15 kHz.

12. A method as claimed in claim 1 wherein the outer skin of the pipe is heated to a temperature of about 120 to about 300° C. for about 5 to about 30 seconds.

13. A method as claimed in claim 12 wherein said heating is to about 140° to about 250° C. for about 10 to about 20 seconds.

14. A method as claimed in claim 1 wherein the pipeline is in service carrying liquid at a temperature of about 5° to about 70° C.

15. A method as claimed in claim 1 wherein said transient heating is applied by an inductor travelling along the pipeline at a linear speed of about 2 to about 50 feet per minute.

16. A method as claimed in claim 15 wherein said speed is about 5 to about 15 feet per minute.

\* \* \* \* \*